(12) United States Patent
Secatch et al.

(10) Patent No.: US 10,872,015 B2
(45) Date of Patent: Dec. 22, 2020

(54) DATA STORAGE SYSTEM WITH STRATEGIC CONTENTION AVOIDANCE

(71) Applicant: Seagate Technology LLC, Cupertino, CA (US)

(72) Inventors: Stacey Secatch, Niwot, CO (US); Steven S. Williams, Longmont, CO (US); David W. Claude, Loveland, CO (US); Benjamin J. Scott, Longmont, CO (US); Kyumsung Lee, Louisville, CO (US); Jeff Rogers, Dunlap, IL (US)

(73) Assignee: Seagate Technology LLC, Fremont, CA (US)

( * ) Notice: Subject to any disclaimer, the term of this patent is extended or adjusted under 35 U.S.C. 154(b) by 176 days.

(21) Appl. No.: 16/023,234

(22) Filed: Jun. 29, 2018

(65) Prior Publication Data

US 2020/0004636 A1 Jan. 2, 2020

(51) Int. Cl.
*G06F 11/14* (2006.01)
*G06F 1/30* (2006.01)
*G06F 3/06* (2006.01)
*G06F 12/02* (2006.01)

(52) U.S. Cl.
CPC ............ *G06F 11/1441* (2013.01); *G06F 1/30* (2013.01); *G06F 3/061* (2013.01); *G06F 3/0659* (2013.01); *G06F 3/0679* (2013.01); *G06F 12/0246* (2013.01)

(58) Field of Classification Search
CPC .. G06F 3/0619; G06F 3/0679; G06F 12/0246; G06F 1/30; G06F 11/1441
See application file for complete search history.

(56) References Cited

U.S. PATENT DOCUMENTS

| | | | |
|---|---|---|---|
| 5,555,420 A | 9/1996 | Sarangdhar et al. | |
| 6,081,783 A | 6/2000 | Divine et al. | |
| 6,219,741 B1 | 4/2001 | Pawlowski et al. | |
| 9,933,955 B1* | 4/2018 | Gosla | G06F 3/0656 |
| 2015/0022918 A1* | 1/2015 | Qiang | G11B 20/10 360/55 |
| 2015/0177813 A1* | 6/2015 | Bailey | G06F 1/3206 713/320 |
| 2015/0347247 A1* | 12/2015 | Baek | G06F 12/123 714/6.11 |
| 2016/0162186 A1* | 6/2016 | Kashyap | G06F 3/0688 711/103 |
| 2017/0212568 A1* | 7/2017 | Kelly | G06F 1/3275 |
| 2018/0067881 A1 | 3/2018 | Frandzel et al. | |
| 2018/0095675 A1 | 4/2018 | Kachare et al. | |
| 2018/0101494 A1 | 4/2018 | Davis et al. | |
| 2018/0373450 A1* | 12/2018 | Ji | G06F 3/0611 |

* cited by examiner

*Primary Examiner* — Jigar P Patel
(74) *Attorney, Agent, or Firm* — Hall Estill Attorneys at Law

(57) ABSTRACT

A data storage system can connect a plurality of remote hosts to a plurality of die sets resident in a semiconductor memory. Execution of at least one data access command addressed by a remote host of the plurality of remote hosts can occur prior to a power interruption event being detected for at least one die set of the plurality of die sets. User-generated data associated with the at least one data access command may then be flushed to a predetermined location responsive to an available resource budget associated with the power interruption event.

20 Claims, 6 Drawing Sheets

DATA STORAGE SYSTEM WITH STRATEGIC CONTENTION AVOIDANCE

SUMMARY

Various embodiments of the present disclosure are generally directed to the managing data access operations to a memory, such as, but not limited to, a flash memory in a solid state drive (SSD).

In accordance with some embodiments, a data storage system connects a plurality of remote hosts to a plurality of die sets resident in a semiconductor memory. Execution of at least one data access command addressed by a remote host of the plurality of remote hosts occurs prior to a power interruption event being detected for at least one die set of the plurality of die sets. User-generated data associated with the at least one data access command is then flushed to a predetermined location responsive to an available resource budget associated with the power interruption event.

A data storage system, in various embodiments, connects a plurality of remote hosts to a plurality of die sets resident in a semiconductor memory. At least one data access command addressed by a remote host of the plurality of remote hosts is executed prior to a power interruption strategy being generated by an interruption module connected to the plurality of die sets. A power interruption event is detected for at least one die set of the plurality of die sets and user-generated data associated with the at least one data access command is then flushed to a predetermined location responsive to an available resource budget associated with the power interruption event.

Other embodiments arrange a data storage system with a plurality of remote hosts connected to a plurality of die sets resident in a semiconductor memory, a queue populated with at least one data access command addressed by a remote host of the plurality of remote hosts, an interruption module configured to detect a power interruption event for at least one die set of the plurality of die sets and flush user-generated data associated with the at least one data access command to a predetermined location responsive to an available resource budget associated with the power interruption event.

DETAILED DESCRIPTION

Figure 1:
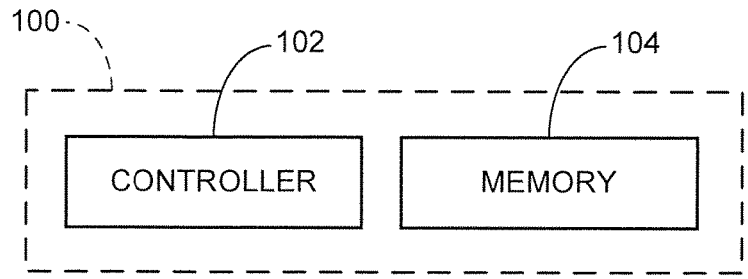
FIG. 1 provides a functional block representation of a data storage device in accordance with various embodiments.

Without limitation, the various embodiments disclosed herein are generally directed to managing data accesses to different die set portions a data storage system to provide optimized system power up initialization.

Solid state drives (SSDs) are data storage devices that store user data in non-volatile memory (NVM) made up of an array of solid-state semiconductor memory cells. SSDs usually have an NVM module and a controller. The controller controls the transfer of data between the NVM and a host device. The NVM will usually be NAND flash memory, but other forms of solid-state memory can be used.

A flash memory module may be arranged as a series of dies. A die represents a separate, physical block of semiconductor memory cells. The controller communicates with the dies using a number of channels, or lanes, with each channel connected to a different subset of the dies. Any respective numbers of channels and dies can be used. Groups of dies may be arranged into die sets, which may correspond with the NVMe (Non-Volatile Memory Express) Standard. This standard enables multiple owners (users) to access and control separate portions of a given SSD (or other memory device).

Metadata is often generated and used to describe and control the data stored to an SSD. The metadata may take the form of one or more map structures that track the locations of data blocks written to various GCUs (garbage collection units), which are sets of erasure blocks that are erased and allocated as a unit. The map structures can include a top-level map and a number of journal updates to the general map, although other forms can be used.

The top-level map provides an overall map structure that can be accessed by a controller to service a received host access command (e.g., a write command, a read command, etc.). The top-level map may take the form of a two-tier map, where a first tier of the map maintains the locations of map pages and a second tier of the map provides a flash transition layer (FTL) to provide association of logical addresses of the data blocks to physical addresses at which the blocks are stored. Other forms of maps can be used including single tier maps and three-or-more tier maps, but each generally provides a forward map structure in which pointers may be used to point to each successive block until the most current version is located.

A reverse directory can be written to the various GCUs and provides local data identifying, by logical address, which data blocks are stored in the associated GCU. The reverse directory, also sometimes referred to as a footer, thus provides a physical to logical association for the locally stored blocks. As with the top-level map, the reverse directory can take any number of suitable forms. Reverse directories are particularly useful during garbage collection operations, since a reverse directory can be used to determine which data blocks are still current and should be relocated before the associated erasure blocks in the GCU are erased.

SSDs expend a significant amount of resources on maintaining accurate and up-to-date map structures. Nevertheless, it is possible from time to time to have a mismatch between the forward map and the reverse directory for a given GCU. These situations are usually noted at the time of garbage collection. For example, the forward map may indicate that there are X valid data blocks in a given erasure block (EB), but the reverse directory identifies a different number Y valid blocks in the EB. When this type of mismatch occurs, the garbage collection operation may be rescheduled or may take a longer period of time to complete while the system obtains a correct count before proceeding with the recycling operation.

The NVMe specification provides that a storage device should have the ability to provide guaranteed levels of deterministic performance for specified periods of time (deterministic windows, or DWs). To the extent that a garbage collection operation is scheduled during a DW, it is desirable to ensure that the actual time that the garbage collection operation would require to complete is an accurate estimate in order for the system to decide whether and when to carry out the GC operation.

SSDs include a top level controller circuit and a flash (or other semiconductor) memory module. A number of channels, or lanes, are provided to enable communications between the controller and dies within the flash memory. One example is an 8 lane/128 die configuration, with each lane connected to 16 dies. The dies are further subdivided into planes, GCUs, erasure blocks, pages, etc. Groups of dies may be arranged into separate die sets, or namespaces. This allows the various die sets to be concurrently serviced for different owners (users).

A scram operation refers to the processing that takes place when power is removed from an SSD. Power down conditions can arise due to a variety of reasons, such as inadvertent power failure, user operation to remove an SSD, or user operation to deactivate an SSD. A relatively small amount of standby power may be provided to enable the SSD to continue to operate during the shutdown operation, such as from a battery, a capacitor, etc.

It is generally necessary to complete any data write operations that are in process, as well as to flush any cached write back data to the flash memory as part of the shutdown process. This can cause difficulties if a large amount of processing is required to complete the transfers for a particular set or group of sets. This is particularly useful in an Input/Output deterministic environment where certain levels of performance are to be maintained.

SSDs have a limited number of hold up energy after power loss that is tied to the number of capacitors. An increase in the number of capacitors allows data storage device alive longer after power loss, so it is important to maximize them. On the other hand, limiting the amount of host and metadata that can be written after power loss can restrict the data storage performance, since work will need to be denied until previously open work has completed. In contrast, the more metadata you can write on power loss improves the time to ready when the data storage device comes back up again, and less work needs to be done in order to fully reload the data storage device context.

As a map, or forward table, is updated by new host writes, journals containing the information in the updates are committed to the flash describing changes. They are sequential in nature—each journal depends on the all the journals written before it. Periodic writes to the flash of the new state of the map supersede the journals written for the same time period. When the data storage device is resumed after power loss, the latest version of the map is loaded into the forward table, and all the journals are read in sequence in order to update the map to the current state of the device.

For set support, the data storage device is split into logically separate and possibly physically separate die sets. The map is also split into those die sets and contains the lookup information on a per set basis.

Accordingly, contentions for resources are reduced during a scram operation by pre-selecting alternative locations for the writing of data to other die sets to ensure that all writes complete within the allotted time and energy budgets. The general idea is that each die set will have at least one storage location, such as a GCU, erasure block(s), etc. located in a different one of the die sets for the storage of data. Multiple alternate locations may be designated in a priority order. In one example, using Sets 1-4, Set 1 may use a location in Set 2, Set 2 may use a location in Set 3, Set 3 may use a location in Set 4 and Set 4 may use a location in Set 1 (round robin). In another example, each set is assigned a location to accept overflow data irrespective of which other set it came from.

At the time of a power down event, a status of the state of the system is evaluated. If there is sufficient time/energy to complete a straight up transfer, this is carried out. However, if not, then the alternate location(s) are used to ensure the data are transferred. The transfers may need to be staggered, but a solution is mapped and carried out to ensure all data groups are written. A log data structure is saved and used during subsequent initialization to get the data where it needs to be. To the extent that data are saved to other partitions, safeguards are used to protect the data such as using double encryption. That is, the data could be encrypted so that the owner cannot access the data. Mapping and other considerations need to be used as well if overlapping LBAs or other logical designators are used in the same namespace/die set.

In other words, upon power loss, current writes need to be committed into the flash array. Likewise, all the pending work also needs to be committed into the flash array. Any memory die contention where two writes are attempting to commit to the same die will cause the time to execute a scram operation to be lengthened. By reducing the amount of contention within a given scram operation cycle allows the cycle to be completed quicker or to provide a larger share of time to write more metadata context, such as for quicker power on times.

As part of our scram operation budget, each die set contains a preassigned location for flushing pending data, including the pending journal updates. Rather than having to write the all of the pending data across the drive, the data is split out by set, and each portion of the journal is written its specifically allocated set. It is noted that even without die sets, data storage capacity can be allocated to do the writes by N times after splitting up the journal N ways, which is particularly effective for die sets since the data storage device is already maintaining N maps.

These and other features may be practiced in a variety of different data storage devices, but various embodiments conduct wear range optimization in the example data storage device 100 shown as a simplified block representation in FIG. 1. The device 100 has a controller 102 and a memory module 104. The controller block 102 represents a hardware-based and/or programmable processor-based circuit configured to provide top level communication and control functions. The memory module 104 includes solid state non-volatile memory (NVM) for the storage of user data from one or more host devices 106, such as other data storage devices, network server, network node, or remote controller.

Figure 2:
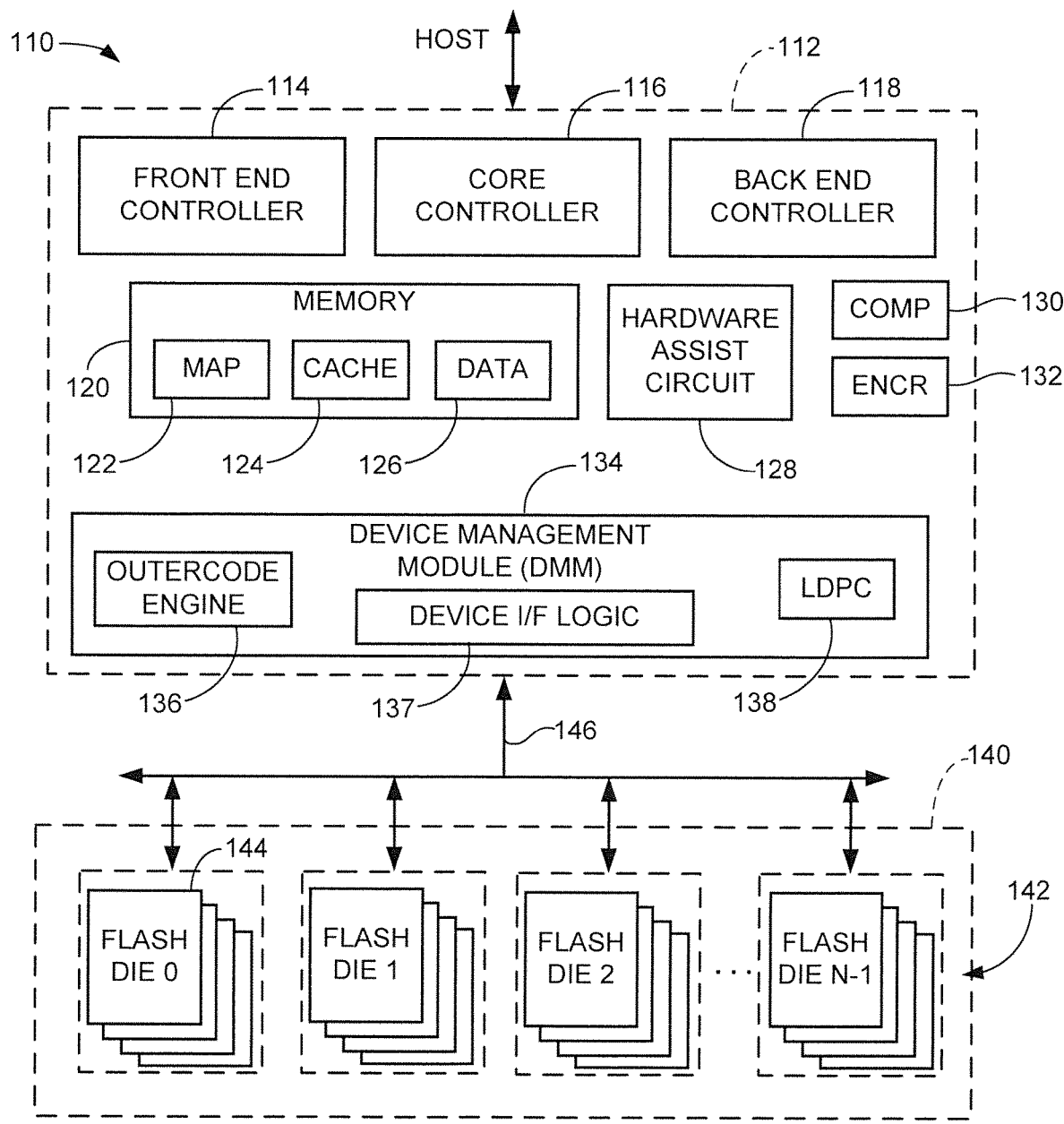
FIG. 2 shows aspects of the device of FIG. 1 characterized as a solid state drive (SSD) in accordance with some embodiments.

FIG. 2 displays an example data storage device 110 generally corresponding to the device 100 in FIG. 1. The device 110 is configured as a solid state drive (SSD) that communicates with one or more host devices via one or more Peripheral Component Interface Express (PCIe) ports, although other configurations can be used. The NVM is contemplated as comprising NAND flash memory, although other forms of solid state non-volatile memory can be used.

In at least some embodiments, the SSD operates in accordance with the NVMe (Non-Volatile Memory Express) Standard, which enables different users to allocate die sets for use in the storage of data. Each die set may form a portion a a Namespace that may span multiple SSDs or be contained within a single SSD.

The SSD 110 includes a controller circuit 112 with a front end controller 114, a core controller 116 and a back end controller 118. The front end controller 114 performs host I/F functions, the hack end controller 118 directs data transfers with the memory module 114 and the core controller 116 provides top level control for the device.

Each controller 114, 116 and 118 includes a separate programmable processor with associated programming (e.g., firmware, FW) in a suitable memory location, as well as various hardware elements to execute data management and transfer functions. This is merely illustrative of one embodiment; in other embodiments, a single programmable processor (or less/more than three programmable processors) can be configured to carry out each of the front end, core and back end processes using associated FW in a suitable memory location. A pure hardware based controller configuration can also be used. The various controllers may be integrated into a single system on chip (SOC) integrated circuit device, or may be distributed among various discrete devices as required.

A controller memory 120 represents various forms of volatile and/or non-volatile memory (e.g., SRAM, DDR DRAM, flash, etc.) utilized as local memory by the controller 112. Various data structures and data sets may be stored by the memory including one or more map structures 122, one or more caches 124 for map data and other control information, and one or more data buffers 126 for the temporary storage of host (user) data during data transfers.

A non-processor based hardware assist circuit 128 may enable the offloading of certain memory management tasks by one or more of the controllers as required. The hardware circuit 128 does not utilize a programmable processor, but instead uses various forms of hardwired logic circuitry such as application specific integrated circuits (ASICs), gate logic circuits, field programmable gate arrays (FPGAs), etc.

Additional functional blocks can be realized in hardware and/or firmware in the controller 112, such as a data compression block 130 and an encryption block 132. The data compression block 130 applies lossless data compression to input data sets during write operations, and subsequently provides data de-compression during read operations. The encryption block 132 provides any number of cryptographic functions to input data including encryption, hashes, decompression, etc.

A device management module (DMM) 134 supports back end processing operations and may include an outer code engine circuit 136 to generate outer code, a device I/F logic circuit 137 and a low density parity check (LDPC) circuit 138 configured to generate LDPC codes as part of the error detection and correction strategy used to protect the data stored by the by the SSD 110.

A memory module 140 corresponds to the memory 104 in FIG. 1 and includes a non-volatile memory (NVM) in the form of a flash memory 142 distributed across a plural number N of flash memory dies 144. Rudimentary flash memory control electronics (not separately shown in FIG. 2) may be provisioned on each die 144 to facilitate parallel data transfer operations via one or more channels (lanes) 146.

Figure 3:
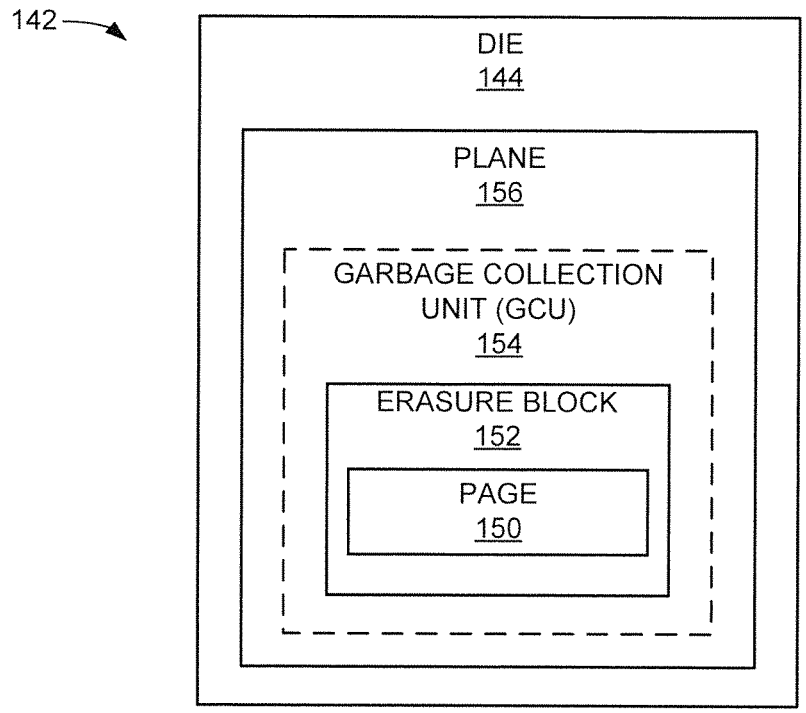
FIG. 3 is an arrangement of the flash memory of FIG. 2 in some embodiments.

FIG. 3 shows an arrangement of the various flash memory dies 144 in the flash memory 142 of FIG. 2 in some embodiments. Other configurations can be used. The smallest unit of memory that can be accessed at a time is referred to as a page 150. A page may be formed using a number of flash memory cells that share a common word line. The storage size of a page can vary; current generation flash memory pages can store, in some cases, 16 KB (16,384 bytes) of user data.

The memory cells 148 associated with a number of pages are integrated into an erasure block 152, which represents the smallest grouping of memory cells that can be concurrently erased in a NAND flash memory. A number of erasure blocks 152 are turn incorporated into a garbage collection unit (GCU) 154, which are logical structures that utilize erasure blocks that are selected from different dies. GCUs are allocated and erased as a unit. In some embodiments, a GCU may be formed by selecting one or more erasure blocks from each of a population of dies so that the GCU spans the population of dies.

Each die 144 may include a plurality of planes 156. Examples include two planes per die, four planes per die, etc. although other arrangements can be used. Generally, a plane is a subdivision of the die 144 arranged with separate read/write/erase circuitry such that a given type of access operation (such as a write operation, etc.) can be carried out simultaneously by each of the planes to a common page address within the respective planes.

Figure 4:
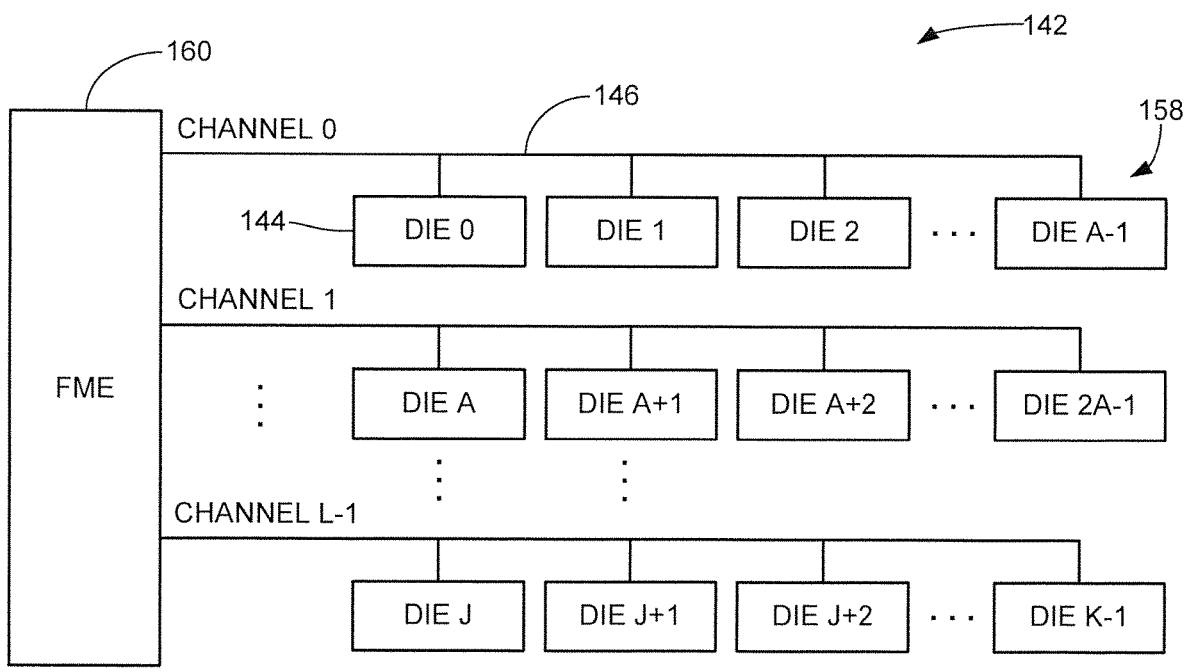
FIG. 4 illustrates the use of channels to access the dies in FIG. 3 in some embodiments.

FIG. 4 shows further aspects of the flash memory 142 in some embodiments. A total number K dies 144 are provided and arranged into physical die groups 158. Each die group 158 is connected to a separate channel 146 using a total number of L channels. In one example, K is set to 128 dies, L is set to 8 channels, and each physical die group has 16 dies. As noted above, a single die within each physical die group can be accessed at a time using the associated channel. A flash memory electronics (FME) circuit 160 of the flash memory module 142 controls each of the channels 146 to transfer data to and from the dies 144.

In some embodiments, the various dies are arranged into one or more die sets. A die set represents a portion of the storage capacity of the SSD that is allocated for use by a particular host (user/owner). Die sets are usually established with a granularity at the die level, so that some percentage of the total available dies 144 will be allocated for incorporation into a given die set.

A first example die set is denoted at 162 in FIG. 4. This first set 162 uses a single die 144 from each of the different channels 146. This arrangement provides fast performance during the servicing of data transfer commands for the set since all eight channels 146 are used to transfer the associated data. A limitation with this approach is that if the set 162 is being serviced, no other die sets can be serviced during that time interval. While the set 162 only uses a single die from each channel, the set could also be configured to use multiple dies from each channel, such as 16 dies/channel, 32 dies/channel, etc.

A second example die set is denoted at 164 in FIG. 4. This set uses dies 144 from less than all of the available channels 146. This arrangement provides relatively slower overall performance during data transfers as compared to the set 162, since for a given size of data transfer, the data will be transferred using fewer channels. However, this arrangement advantageously allows the SSD to service multiple die sets at the same time, provided the sets do not share the same (e.g., an overlapping) channel 146.

Figure 5:
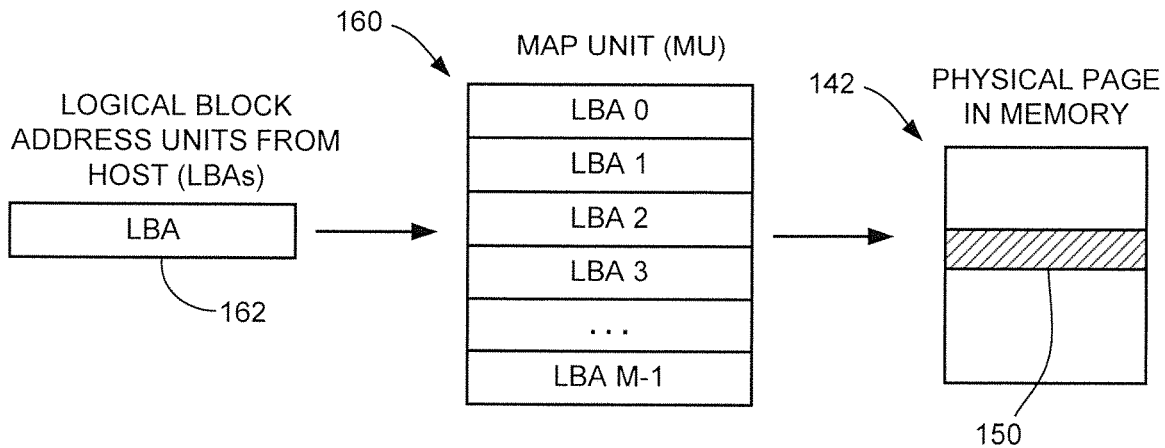
FIG. 5 represents a map unit (MU) as a data arrangement stored to the flash memory of FIG. 2.

FIG. 5 illustrates a manner in which data may be stored to the flash memory module 142. Map units (MUs) 170 represent fixed sized blocks of data that are made up of one or more user logical block address units (LBAs) 172 supplied by the host. Without limitation, the LBAs 172 may have a first nominal size, such as 512 bytes (B), 1024 B (1 KB), etc., and the MUs 170 may have a second nominal size, such as 4096 B (4 KB), etc. The application of data compression may cause each MU to have a smaller size in terms of actual bits written to the flash memory 142.

The MUs 170 are arranged into the aforementioned pages 150 (FIG. 3) which are written to the memory 142. In the present example, using an MU size of 4 KB, then nominally four (4) MUs may be written to each page. Other configurations can be used. To enhance data density, multiple pages worth of data may be written to the same flash memory cells connected to a common control line (e.g., word line) using multi-bit writing techniques; MLCs (multi-level cells) write two bits per cell, TLCs (three-level cells) write three bits per cell; XLCs (four level cells) write four bits per cell, etc.

Data stored by an SSD are often managed using metadata. The metadata provide map structures to track the locations of various data blocks (e.g., MUAs 170) to enable the SSD 110 to locate the physical location of existing data. For example, during the servicing of a read command it is generally necessary to locate the physical address within the flash memory 144 at which the most current version of a requested block (e.g., LBA) is stored, so that the controller can schedule and execute a read operation to return the requested data to the host. During the servicing of a write command, new data are written to a new location, but it is still necessary to locate the previous data blocks sharing the same logical address as the newly written block so that the metadata can be updated to mark the previous version of the block as stale and to provide a forward pointer or other information to indicate the new location for the most current version of the data block.

Figure 6:
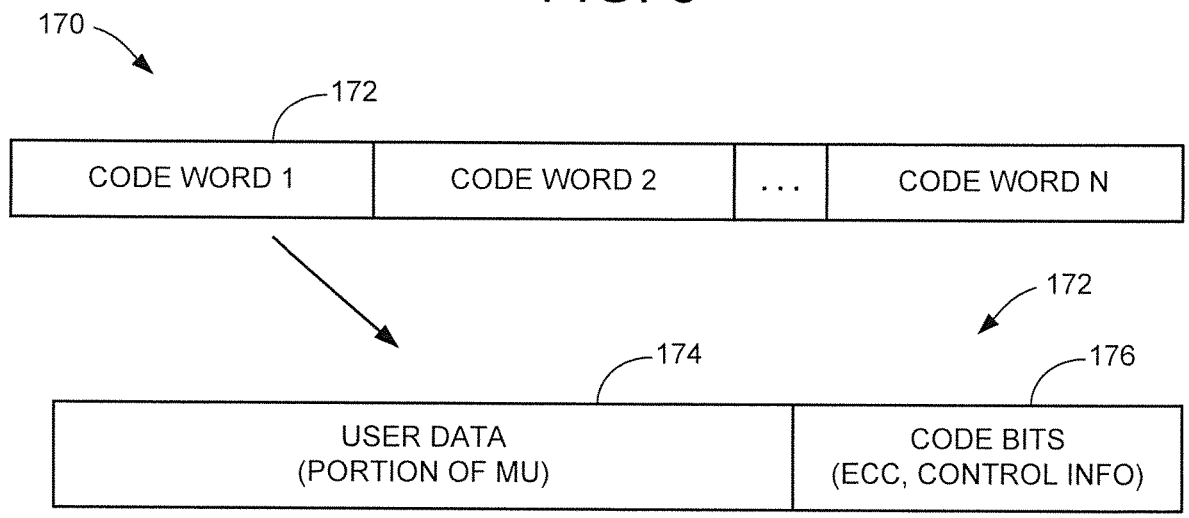
FIG. 6 shows a functional block diagram for a GCU management circuit of the SSD in accordance with some embodiments.

FIG. 6 shows a functional block diagram for a GCU management circuit 180 of the SSD 110 in accordance with some embodiments. The circuit 180 may form a portion of the controller 112 and may be realized using hardware circuitry and/or one or more programmable processor circuits with associated firmware in memory. The circuit 180 includes the use of a forward map 182 and a reverse directory 184. As noted above, the forward map and reverse directory are metadata data structures that describe the locations of the data blocks in the flash memory 142. During the servicing of host data transfer operations, as well as other operations, the respective portions of these data structures are located in the flash memory or other non-volatile memory location and copied to local memory 120 (see e.g., FIG. 2).

The forward map 182 provides a flash transition layer (FTL) to generally provide a correlation between the logical addresses of various blocks (e.g., MUAs) and the physical addresses at which the various blocks are stored (e.g., die set, die, plane, GCU, ER, page, bit offset, etc.). The contents of the forward map 182 may be stored in specially configured and designated GCUs in each die set.

The reverse directory 184 provides a physical address to logical address correlation. The reverse directory contents may be written as part of the data writing process to each GCU, such as in the form of a header or footer along with the data being written. Generally, the reverse directory provides an updated indication of how many of the data blocks (e.g., MUAs) are valid (e.g., represent the most current version of the associated data).

The circuit 180 further includes a map integrity control circuit 186. As explained below, this control circuit 186 generally operates at selected times to recall and compare, for a given GCU, the forward map data and the reverse directory data. This evaluation step includes processing to determine if both metadata structures indicate the same number and identify of the valid data blocks in the GCU.

If the respective forward map and reverse directory match, the GCU is added to a list of verified GCUs in a data structure referred to as a table of verified GCUs, or TOVG 188. The table can take any suitable form and can include a number of entries, with one entry for each GCU. Each entry can list the GCU as well as other suitable and useful information, such as but not limited to a time stamp at which the evaluation took place, the total number of valid data blocks that were determined to be present at the time of validation, a listing of the actual valid blocks, etc.

Should the control circuit 186 find a mismatch between the forward map 182 and the reverse directory 184 for a given GCU, the control circuit 186 can further operate to perform a detailed evaluation to correct the mismatch. This may include replaying other journals or other data structures to trace the history of those data blocks found to be mismatched. The level of evaluation required will depend on the extent of the mismatch between the respective metadata structures.

For example, if the forward map 182 indicates that there should be some number X valid blocks in the selected GCU, such as 12 valid blocks, but the reverse directory 184 indicates that there are only Y valid blocks, such as 11 valid blocks, and the 11 valid blocks indicated by the reverse directory 184 are indicated as valid by the forward map, then the focus can be upon the remaining one block that is valid according to the forward map but invalid according to the reverse directory. Other mismatch scenarios are envisioned.

The mismatches can arise due to a variety of factors such as incomplete writes, unexpected power surges or disruptions that prevent a full writing of the state of the system, etc. Regardless, the control circuit can expend the resources as available to proactively update the metadata. In some embodiments, an exception list 190 may be formed as a data structure in memory of GCUs that have been found to require further evaluation. In this way, the GCUs can be evaluated later at an appropriate time for resolution, after which the corrected GCUs can be placed on the verified list in the TOVG 188.

It will be noted that the foregoing operation of the control circuit 186 in evaluating GCUs does not take place once a garbage collection operation has been scheduled; instead, this is a proactive operation that is carried out prior to the scheduling of a garbage collection operation. In some cases, GCUs that are approaching the time at which a garbage collection operation may be suitable, such as after the GCU has been filled with data and/or has reached a certain aging limit, etc., may be selected for evaluation on the basis that it can be expected that a garbage collection operation may be necessary in the relatively near future.

FIG. 6 further shows the GCU management circuit 180 to include a garbage collection scheduler circuit 192. This circuit 192 generally operates once it is appropriate to consider performing a garbage collection operation, at which point the circuit 192 selects from among the available verified GCUs from the table 188. In some cases, the circuit 192 may generate a time of completion estimate to complete the garbage collection operation based on the size of the GCU, the amount of data to be relocated, etc.

As will be appreciated, a garbage collection operation can include accessing the forward map and/or reverse directory 182, 184 to identify the still valid data blocks, the reading out and temporary storage of such blocks in a local buffer memory, the writing of the blocks to a new location such as in a different GCU, the application of an erasure operation to erase each of the erasure blocks in the GCU, the updating of program/erase count metadata to indicate the most recent erasure cycle, and the placement of the reset GCU into an allocation pool awaiting subsequent allocation and use for the storage of new data sets.

Figure 7:
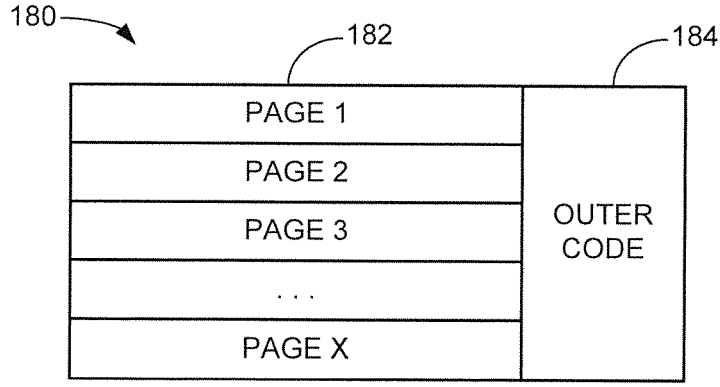
FIG. 7 illustrates an arrangement of various GCUs and corresponding tables of verified GCUs (TOVGs) for a number of different die sets in some embodiments.

FIG. 7 shows a number of die sets 200 that may be arranged across the SSD 110 in some embodiments. Each set 200 may have the same nominal data storage capacity (e.g., the same number of allocated dies, etc.), or each may have a different storage capacity. The storage capacity of each die set 200 is arranged into a number of GCUs 154 as shown. In addition, a separate TOVG (table of verified GCUs) 188 may be maintained by and in each die set 200 to show the status of the respective GCUs. From this, each time that it becomes desirable to schedule a garbage collection operation, such as to free up new available memory for a given set, the table 188 can be consulted to select a GCU that, with a high degree of probability, can be subjected to an efficient garbage collection operation without any unexpected delays due to mismatches in the metadata (forward map and reverse directory).

Figure 8:
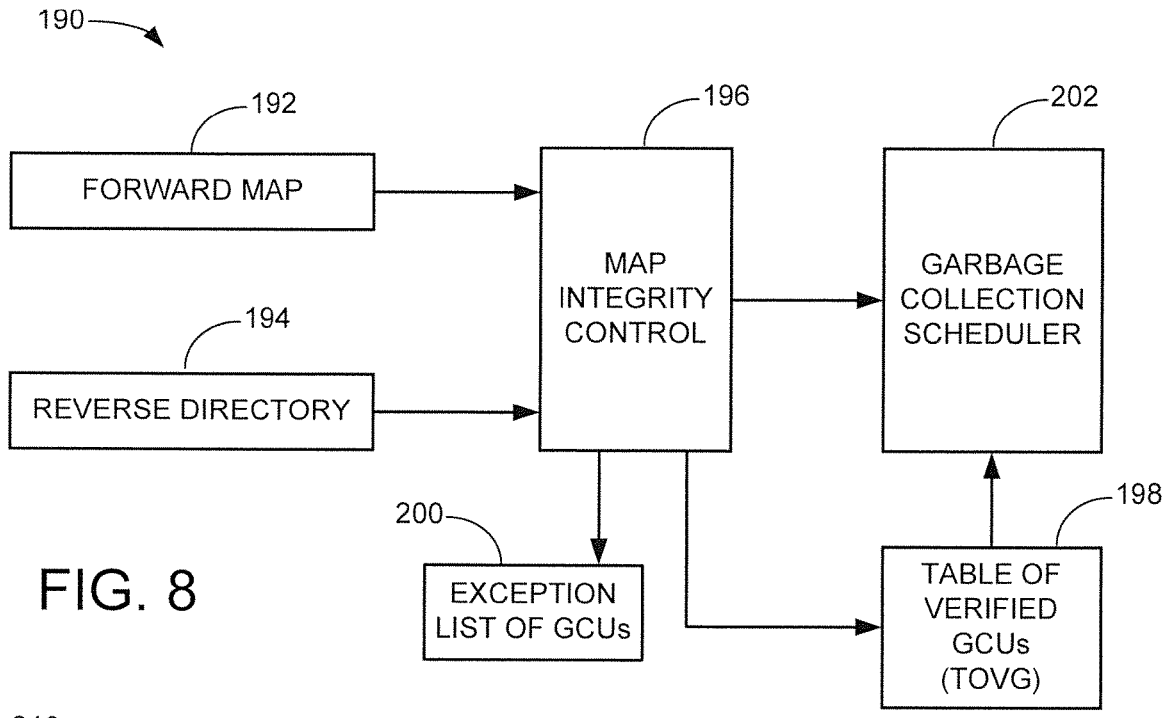
FIG. 8 displays a functional block diagram for a GCU management circuit of the SSD in accordance with some embodiments.

FIG. 8 further shows the GCU management circuit 190 to include a garbage collection scheduler circuit 202. This circuit 202 generally operates once it is appropriate to consider performing a garbage collection operation, at which point the circuit 202 selects from among the available verified GCUs from the table 198. In some cases, the circuit 202 may generate a time of completion estimate to complete the garbage collection operation based on the size of the GCU, the amount of data to be relocated, etc.

As will be appreciated, a garbage collection operation can include accessing the forward map and/or reverse directory 192, 194 to identify the still valid data blocks, the reading out and temporary storage of such blocks in a local buffer memory, the writing of the blocks to a new location such as in a different GCU, the application of an erasure operation to erase each of the erasure blocks in the GCU, the updating of program/erase count metadata to indicate the most recent erasure cycle, and the placement of the reset GCU into an allocation pool awaiting subsequent allocation and use for the storage of new data sets.

Figure 9:
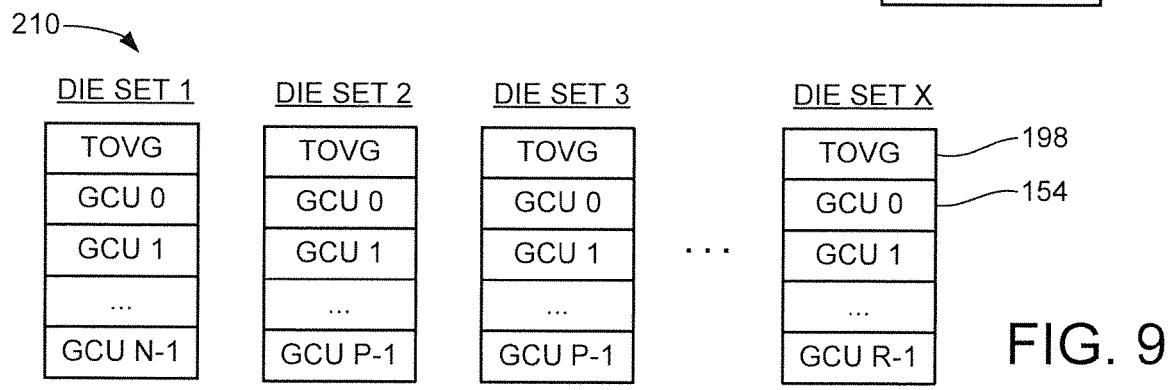
FIG. 9 depicts an arrangement of various GCUs and corresponding tables of verified GCUs (TOVGs) for a number of different die sets in some embodiments.

FIG. 9 shows a number of die sets 210 that may be arranged across the SSD 110 in some embodiments. Each set 210 may have the same nominal data storage capacity (e.g., the same number of allocated dies, etc.), or each may have a different storage capacity. The storage capacity of each die set 210 is arranged into a number of GCUs 154 as shown. In addition, a separate TOVG (table of verified GCUs) 198 may be maintained by and in each die set 210 to show the status of the respective GCUs. From this, each time that it becomes desirable to schedule a garbage collection operation, such as to free up new available memory for a given set, the table 198 can be consulted to select a GCU that, with a high degree of probability, can be subjected to an efficient garbage collection operation without any unexpected delays due to mismatches in the metadata (forward map and reverse directory).

Figure 10:
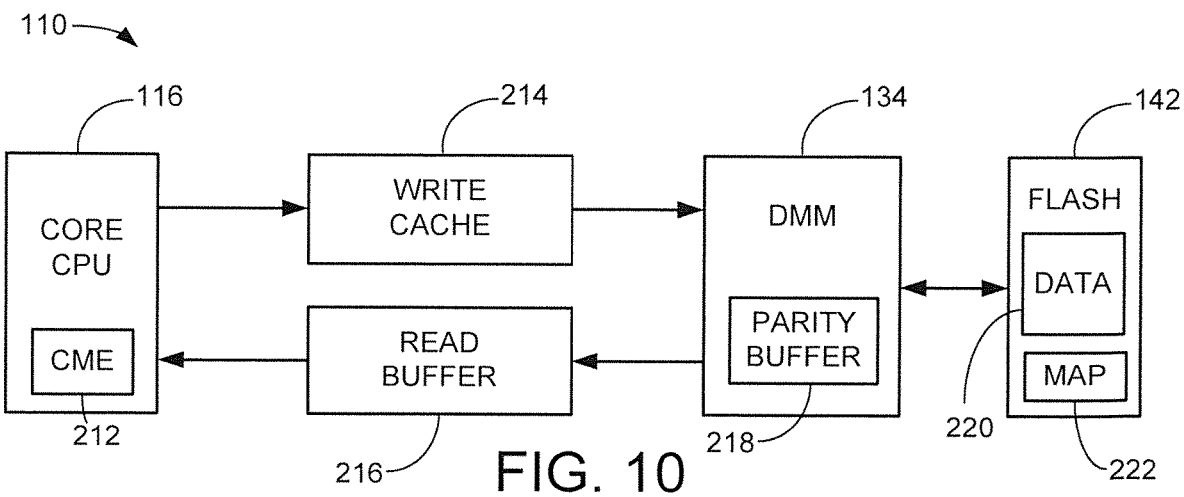
FIG. 10 illustrates an example data set that can be written to the data storage device of FIG. 1 in accordance with assorted embodiments.

FIG. 10 shows a functional block representation of additional aspects of the SSD 110. The core CPU 116 from FIG. 2 is shown in conjunction with a code management engine (CME) 212 that can be used to manage the generation of the respective code words and outer code parity values for both standard and non-standard parity data sets During write operations, input write data from the associated host are received and processed to form MUs 160 (FIG. 3) which are placed into a non-volatile write cache 214 which may be flash memory or other form(s) of non-volatile memory. The MUs are transferred to the DMM circuit 134 for writing to the flash memory 142 in the form of code words 172 as described above. During read operations, one or more pages of data are retrieved to a volatile read buffer 216 for processing prior to transfer to the host.

The CME 212 determines the appropriate inner and outer code rates for the data generated and stored to memory. In some embodiments, the DMM circuit 134 may generate both the inner and outer codes. In other embodiments, the DMM circuit 134 generates the inner codes (see e.g., LDPC circuit 146 in FIG. 2) and the core CPU 116 generates the outer code words. In still other embodiments, the same processor/controller circuit generates both forms of code words. Other arrangements can be used as well. The CME 212 establishes appropriate code rates for both types of code words.

During generation of the outer codes, a parity buffer 218 may be used to successively XOR each payload being written during each pass through the dies. Both payload data 220 and map data 222 will be stored to flash 142.

Figure 11:
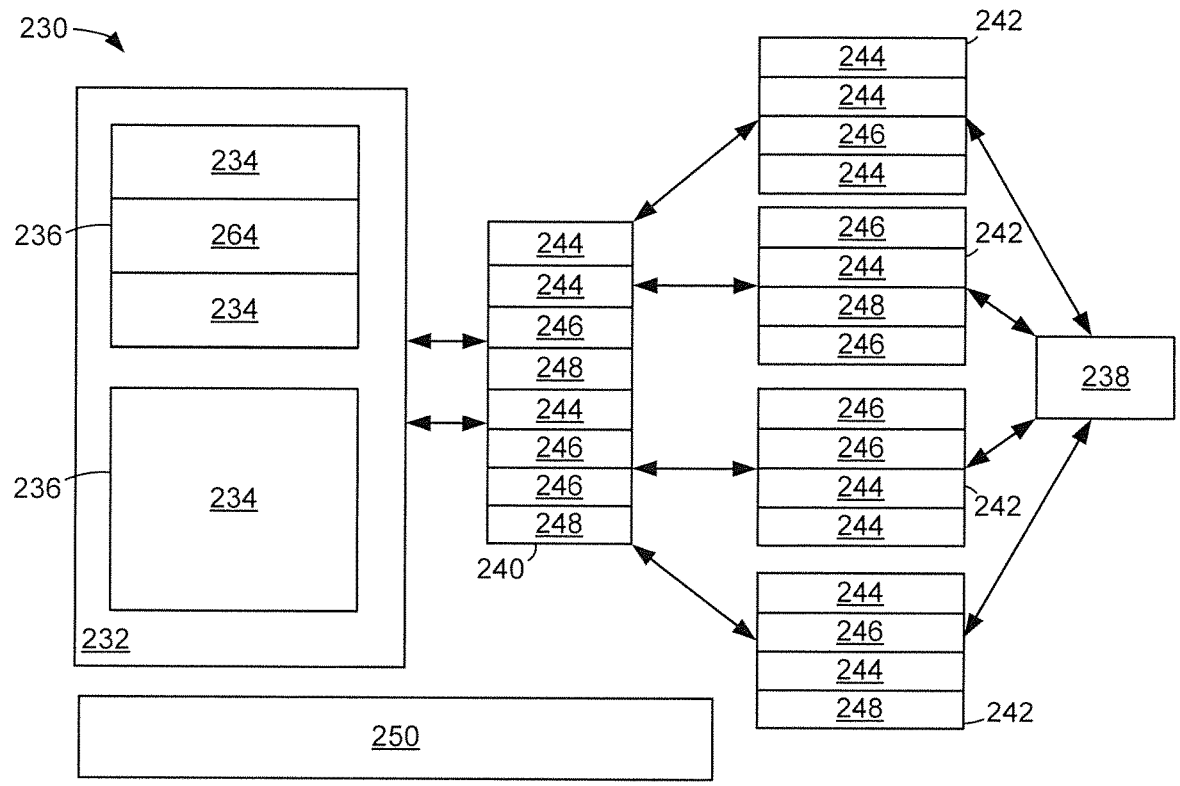
FIG. 11 conveys a block representation of an example data storage system in which various embodiments may be practiced.

FIG. 11 illustrates a block representation of portions of an example data storage system 230 in which a data storage device 232 has numerous logical die sets 234 arranged in semiconductor memory dice 236. The die sets 234 can experience degraded performance when commands from one or more hosts 238 conflict in what can be characterized as a collision. That is, the flow of user-generated data and associated system data, like map, journal, and metadata, from the host 238 to a die set 234 through a channel queue 240 and die set specific queues 242 can demand system resources that are being used elsewhere, which delays execution of commands, degrades data throughput, and slows system initialization during power on startup.

Occupied system resources and the delay of data access command execution is particularly stressed during deterministic window intervals where data access performance consistency is emphasized. For instance, a first die set 234 can be in a non-deterministic window interval and is occupying system resources by executing data reads 244, data writes 246, and/or background operations 248 while a second die set 236 is in a deterministic window interval. It is noted that a data storage system 230 can comprise any number of queues 240/242 without limitation, but various embodiments arrange the channel queue 240 to execute commands 244/246/248 in the order in which they populate the queue 240 from the set specific queues 242 that have commands 244/246/248 addressed to a single die set 234.

As a result of the potential shuffling of data access commands 244/246/248 from different die set specific queues 242 in the channel queue 240 as directed by a local controller 250, deterministic window command execution consistency is jeopardized. Although it is contemplated that the channel queue 240 commands can be rearranged and/or executed out of order, such activity can occupy valuable processing, power, and time system resources. Hence, embodiments that evaluate system resources and customize the population of the channel queue 240 can optimize system data access performance, system time-to-ready, and deterministic window interval consistency.

Figure 12:
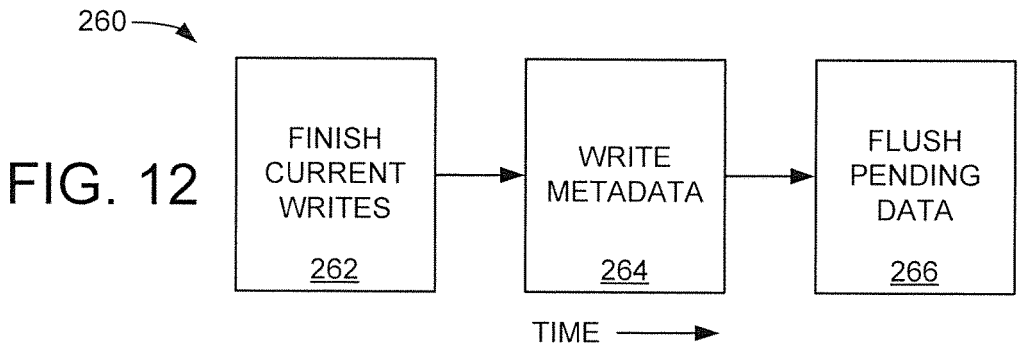
FIG. 12 represents an example power interrupt process that can be conducted in an example data storage system in accordance with various embodiments.

FIG. 12 represents an example power interrupt process 260 that can be employed by a data storage system in accordance with some embodiments. In response to a scheduled, or unscheduled, loss of power to a die set, step 262 finishes data writes that are in process. The metadata associated with the data writes from step 262 are then written in step 264 to any non-volatile memory portion of a data storage device. The remaining queued data are then scheduled to be moved in step 266 to some location. However, due to a variety of reasons, the pending data may not be successfully moved in time, which results in the loss of data, like map and metadata, that can be particularly important when power is restored.

Figure 13:
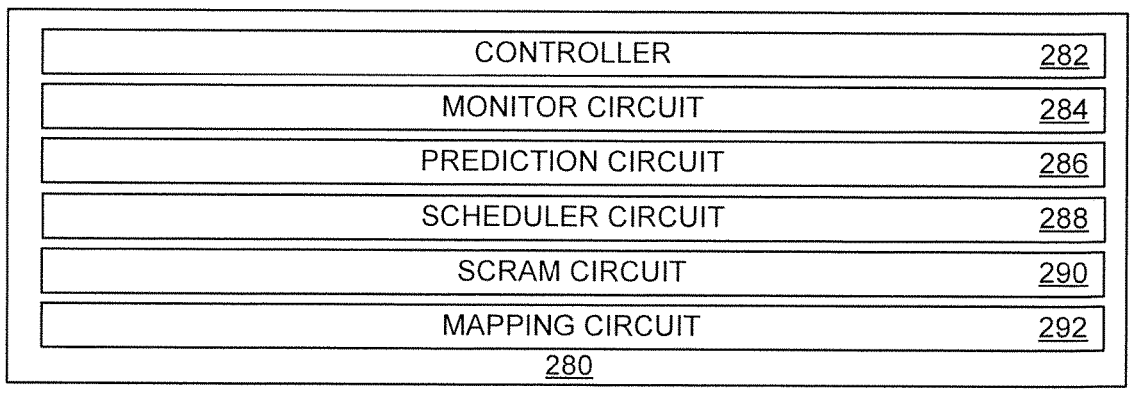
FIG. 13 conveys an example interrupt module that can be employed in a data storage system in accordance with some embodiments.

FIG. 13 provides a block representation of an example interrupt module 280 configured and operated in accordance with some embodiments to balance data access performance across different die sets and hosts. The interrupt module 280 can intelligently utilize constituent circuitry to track performance metrics of executed tasks between multiple different die sets and hosts in a distributed data storage system to reactively and proactively optimize data access requests to concurrently balance data access performance across the system.

The interrupt module 280 can utilize a controller 282, such as a microprocessor or programmable circuitry generally represented by controller 250 of FIG. 11, to direct activity of various circuitry. For instance, real-time data storage system performance metrics, such as latency, error rate, overall time to service a host request, number of background operations triggered, overall queue input-output frequency, and deterministic window interval activation, can be measured and/or detected with a monitor circuit 294. The monitor circuit 284 may maintain a log of detected die set and host activity in local memory in order to allow a prediction circuit 286 of the module 280 to identify patterns and consequential data access tasks.

The prediction circuit 286 can utilize model data from other data storage systems and/or past logged activity from the present system to predict what tasks are likely to arrive in a die set queue as well as how long each task will take to execute in various die sets of a distributed data storage system in view of the present system conditions. The prediction circuit 286 can employ machine learning to improve the accuracy of forecasted background operations, read accesses, and write accessed, as well as the performance of those forecasted tasks, based on real-time tracked executions from the monitor circuit 284. It is contemplated the prediction circuit 286 can generate an accuracy value for forecasted tasks, and/or forecasted performance, and only provide those predictions that are above a predetermined accuracy threshold, such as 90% confidence.

The ability to predict future tasks and their respective execution times to numerous different die sets with the prediction circuit 286 allows the quality of interrupt module 280 to organize existing tasks so that future tasks do not inhibit or degrade consistent read access latency during deterministic window intervals. Knowledge of past executed tasks to a die set attained with the monitor circuit 284 and the accurate prediction of future pending tasks and their execution times allows a scheduler circuit 288 of the module 280 to customize existing queued tasks to at least one die set to optimize future data storage system operation. Queue customization is not limited to a particular action, but is contemplated that the scheduler circuit 288 correlates certain tasks to available system processing bandwidth, prioritizes the longest tasks to execute, prioritizes the shortest tasks to execute, and/or generates background operations out-of-turn.

At any time, the interrupt module 280 can utilize a scram circuit 290 to generate one or more power down strategies associated with inadvertent power loss to a die set. The scram circuit 290 can generate and test more than one different data access command execution procedure that corresponds with a destination within a data storage system to move unwritten data and associated system data. For instance, the scram circuit 290 can generate multiple different power down strategies that react differently to an unscheduled electrical power interruption, such as by executing different data writes and/or background operations along with moving uncomplete pending data writes to different non-volatile memory locations, such as different die sets or cache memory.

The power down strategies generated by the scram circuit 290 may be complemented by a mapping circuit 292 that utilizes the prediction circuit 286 to forecast future data writes, metadata, and background operations that are mapped with global maps, die set maps, journals, and snapshots. The mapping circuit 292 can generate a mapping strategy the supplements the power down strategy from the scram circuit 290 by planning where uncompleted map data will be moved if, and when, pending map data cannot be generated and/or written prior to power loss. A mapping strategy may provide different destination locations for map data compared to unfinished write or metadata choreographed by the power down strategy.

Figure 14:
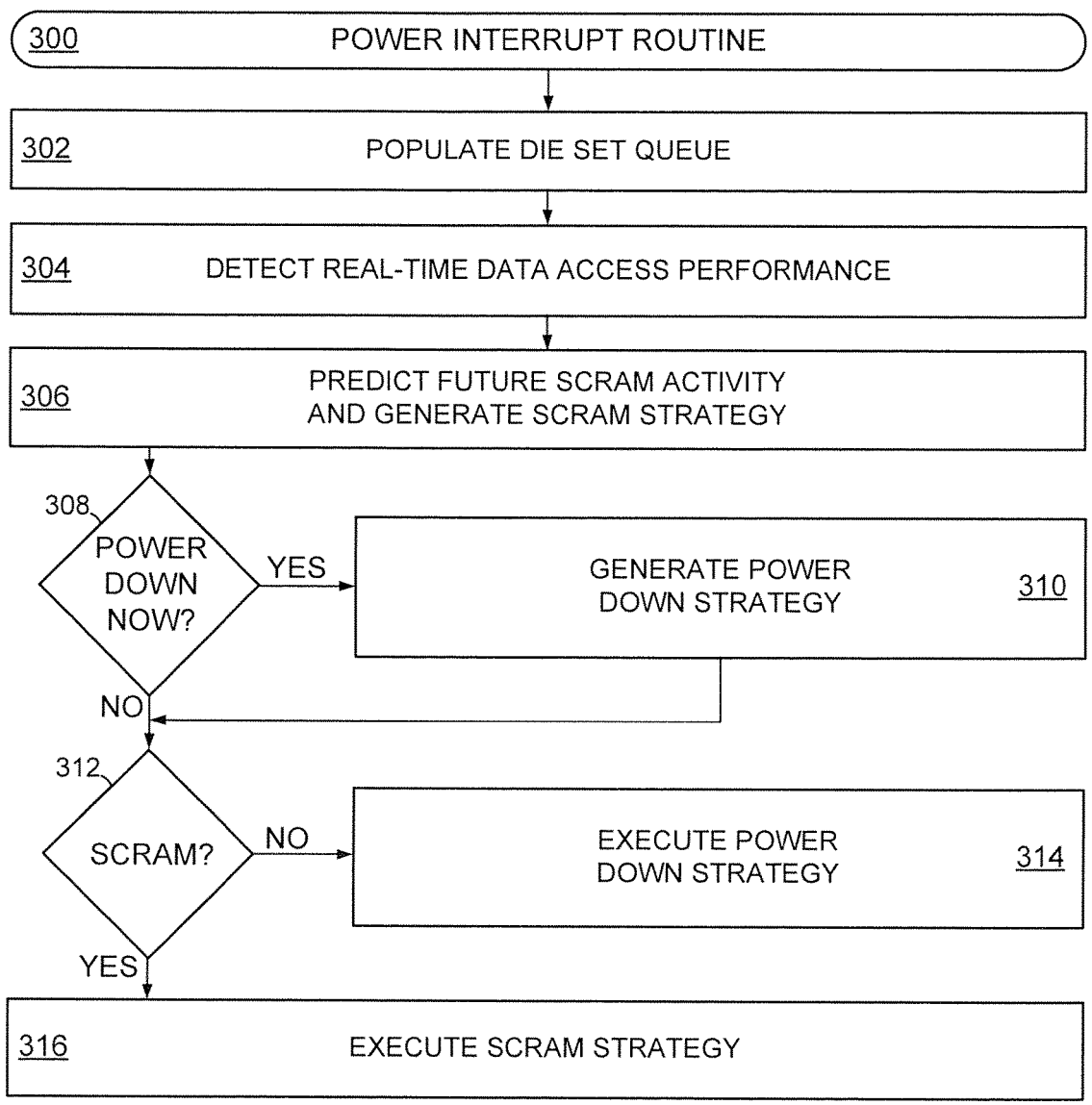
FIG. 14 is an example power interrupt routine that can be executed by the respective embodiments of FIGS. 1-13.

FIG. 14 depicts an example power interrupt routine 300 that can be conducted by the various embodiments of FIGS. 1-13 to optimize the storage of pending user-generated and system data in the event electrical power is interrupted in a scheduled, or unscheduled, manner. Step 302 initially populates one or more die sets with data access commands addresses by remote hosts. The execution of those data access commands is detected in step 304 to provide real-time performance metrics for the data storage system, such as average write latency, average map size, and frequency of background operations.

With real-time performance metrics, an interrupt module can predict future data accesses, background operations, metadata, and map data that are likely to be pending if electrical power is interrupted. It is contemplated that one or more future system operations can be predicted along with resulting volumes of data that can be successfully moved prior to complete power loss. Such information allows step 306 to generate one or more scram strategies that identify different non-volatile data storage locations to quickly move data in the event an unscheduled electrical power loss occurs. In some embodiments, step 306 involves pre-selecting one or more pending data access operations to execute out of queued order to reduce the data storage system's exposure to lost data as a result of an unscheduled electrical power interruption.

Decision 308 can continuously, or sporadically, monitor if electrical power is eminently going to be interrupted. If so, step 310 generates one or more power down strategies that preserves as much pending write data, metadata, and map data as possible. Next, decision 312 evaluates if the eminent power down event is scheduled or unscheduled. If scheduled, step 314 is triggered to select and execute a power down strategy where data writes are completed and any remaining pending data is moved to a predetermined location. If the power down event is unscheduled, scram operations are executed step 316 where a scram power down strategy immediately moves as much pending data as possible to a predetermined non-volatile location in accordance with a scram strategy generated in step 306.

Figure 15:
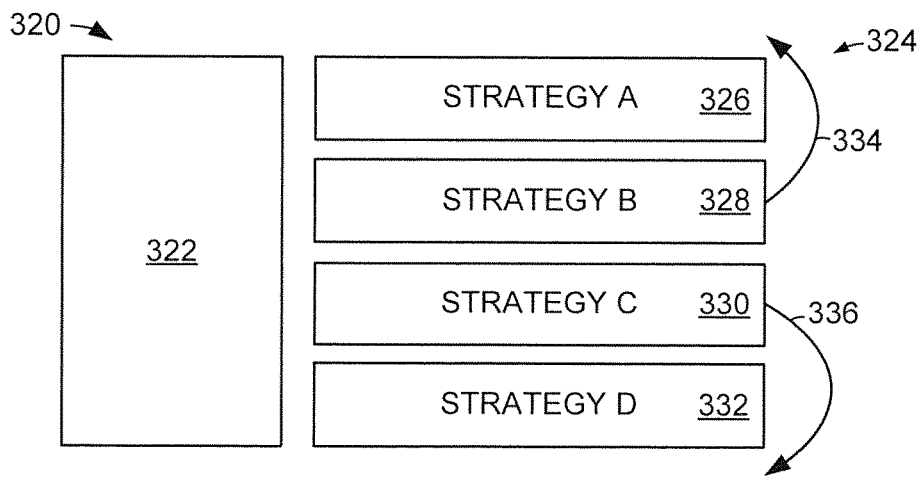
FIG. 15 represents portions of an example data storage system arranged and operated in accordance with assorted embodiments.

FIG. 15 represents portions of an example data storage system 320 in which an interrupt module 322 generates and maintains a strategy list 324 of different scram strategies. While not required or limiting, the assorted strategies 326/328/330/332 can involve different executed data access commands prior to power interruption and/or different non-volatile destinations for unwritten write and system data.

The ability to generate and test different scram strategies 326/328/330/332 based on real-time performance metrics allows the interrupt module 322 to continually, or sporadically, evaluate the assorted strategies 326/328/330/332 based on current system conditions, such as the priority of data, security of data, and volume of pending write and system data. As such, the interrupt module 322 can alter the execution position of a scram strategy to adapt to current, and/or predicted system conditions, as illustrated by the promotion of strategy B 328 and demotion of strategy C 330.

Through the various embodiments of a data storage system, power interruptions can be less drastic and can be more efficiently handled with minimal data loss. The intelligent generation, selection, and execution of a scram power interruption strategy allows data accesses to be executed out of queued order prior to a power interruption and unwritten data to quickly be moved to a predetermined location without large expenditures of system resources, such as electrical power, time, and processing capacity.

What is claimed is:

1. A method comprising:
connecting a plurality of remote hosts to a plurality of die sets resident in a semiconductor memory;
executing at least one data access command addressed by a remote host of the plurality of remote hosts;
generating a power interruption strategy with an interrupt module connected to the plurality of die sets, the power interruption strategy prescribing the execution of a sequence of pending data writes and background operations within an operational timeframe before power loss predicted by the interrupt module;
detecting a power interruption event for at least one die set of the plurality of die sets; and
moving user-generated data associated with the at least one data access command to a predetermined location in accordance with the power interruption strategy responsive to the power interruption event.

2. The method of claim 1, wherein each die set of the plurality of die sets has a separate die set queue.

3. The method of claim 2, wherein a channel queue is fed by each of the plurality of die sets.

4. The method of claim 1, wherein the power interruption event is unscheduled.

5. The method of claim 1, wherein the predicted operational timeframe comprises an amount of electrical power remaining to conduct data operations on at least one of the plurality of die sets.

6. The method of claim 1, wherein the predicted operational timeframe comprises an amount of time remaining to conduct data operations on at least one of the plurality of die sets.

7. The method of claim 1, wherein the predicted operational timeframe comprises an amount of processing capacity remaining to conduct data operations on at least one of the plurality of die sets.

8. The method of claim 1, wherein metadata is moved to the predetermined location after detection of the power interruption event.

9. The method of claim 1, wherein map data is moved to the predetermined location after detection of the power interruption event.

10. A method comprising:
connecting a plurality of remote hosts to a plurality of die sets resident in a semiconductor memory;
executing at least one data access command addressed by a remote host of the plurality of remote hosts;
generating a power interruption strategy with an interrupt module connected to the plurality of die sets the power interruption strategy prescribing the execution of a sequence of pending data writes and background operations within an operational timeframe before power loss predicted by the interrupt module;
detecting a power interruption event for at least one die set of the plurality of die sets; and
flushing user-generated data associated with the at least one data access command to a predetermined location in association with the power interruption strategy responsive to a predicted resource budget associated with the power interruption event.

11. The method of claim 10, wherein the interrupt module comprises a prediction module that forecasts future data access command performance.

12. The method of claim 11, wherein the future data access command performance is forecasted as a result of real-time detected data access performance.

13. The method of claim 10, wherein the interrupt module generates a plurality of different power interruption strategies, each power interruption strategy prescribing a different sequence of pending data writes and background operations on the plurality of die sets, the interrupt module configured to alter which power interruption strategy is executed based on predicted system conditions during the power interruption event.

14. The method of claim 10, wherein the power interruption strategy executes at least one data access command out of a queued order prior to the power interruption event.

15. The method of claim 13, wherein the plurality of different power interruption strategies designate different non-volatile destinations for unwritten write data.

16. The method of claim 13, wherein the plurality of different power interruption strategies designate different non-volatile destinations for unwritten metadata.

17. The method of claim 13, wherein the plurality of different power interruption strategies designate different non-volatile destinations for unwritten map data.

18. The method of claim 10, wherein the interrupt module generates a mapping strategy that designates a non-volatile destination for map data unwritten to a host addressed destination after the power interruption event.

19. A system comprising a plurality of remote hosts connected to a plurality of die sets resident in a semiconductor memory, a queue populated with at least one data access command addressed by a remote host of the plurality of remote hosts, an interrupt module configured to generate a power interruption strategy prescribing the execution of a sequence of pending data writes and background operations within an operational timeframe before power loss predicted by the interrupt module, detect a power interruption event for at least one die set of the plurality of die sets and flush user-generated data associated with the at least one data access command to a predetermined location in accordance with the power interruption strategy responsive to with the power interruption event.

20. The system of claim 19, wherein the predetermined location is generated by a scram circuit of the interrupt module connected to the plurality of die sets.

\* \* \* \* \*